Feb. 2, 1937.  M. B. SAMPLE  2,069,391
MAT
Filed May 29, 1935  2 Sheets-Sheet 1
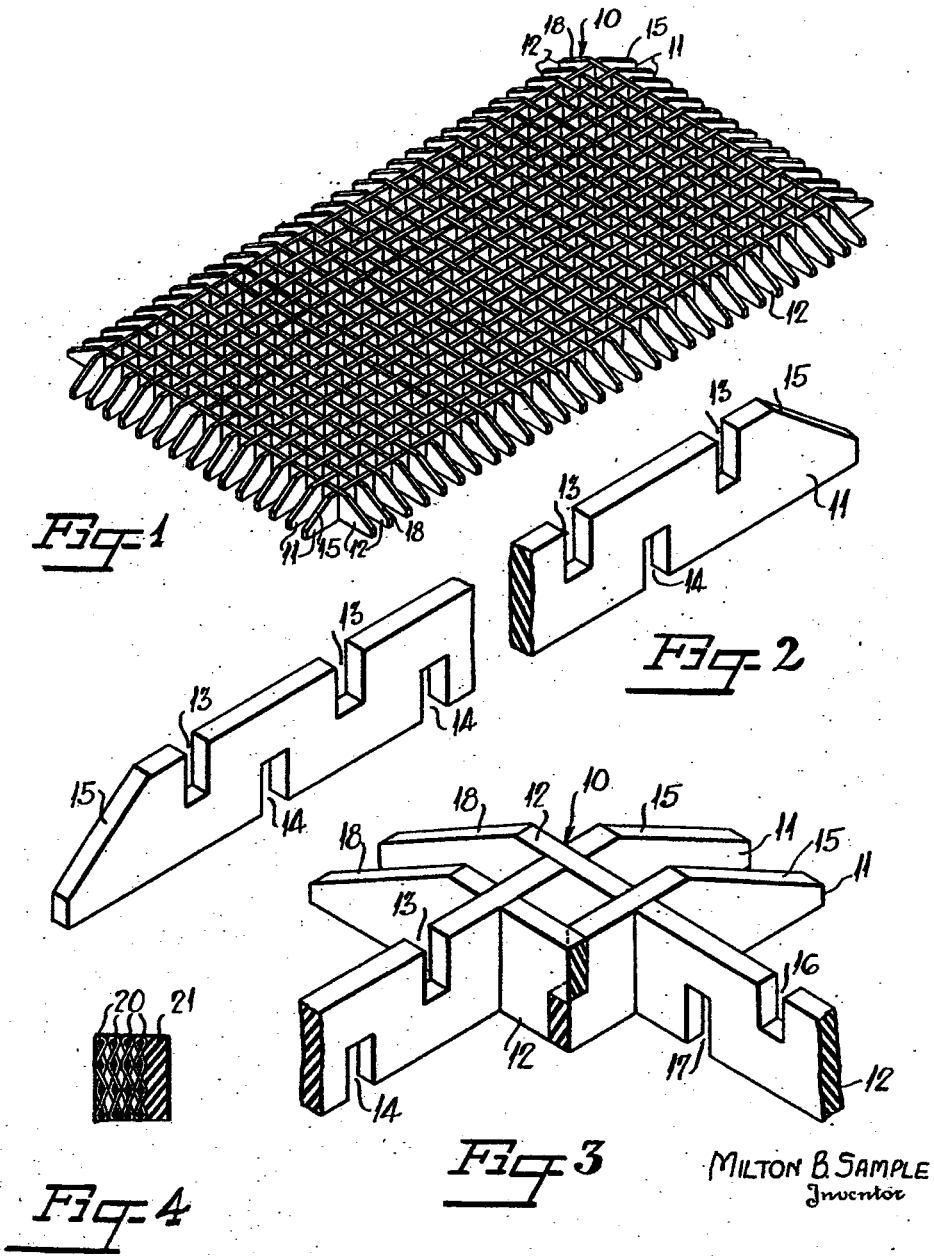

Feb. 2, 1937. M. B. SAMPLE 2,069,391
MAT
Filed May 29, 1935 2 Sheets—Sheet 2

Milton B. Sample
Inventor

Patented Feb. 2, 1937

2,069,391

UNITED STATES PATENT OFFICE 2,069,391

MAT

Milton B. Sample, Houston, Tex.

Application May 29, 1935, Serial No. 24,101

4 Claims. (Cl. 20—74)

This invention relates to a mat and method of making same, and more especially to a mat made of flexible resilient material such as rubber strips of material such as cut from pneumatic tire casings having a plurality of layers of fabric and rubber vulcanized together, and which is made by weaving a plurality of strips together in a manner so that it will be interlocking, self-supporting and will not come apart.

It is an object of this invention to provide a mat woven from flexible strips of material, which may be of any size or shape, but for sake of clearness of description, will be described as having longitudinal and transverse strips of material woven together so that the upper and lower edges of all strips will occupy the same plane, that is, the lower edges of all strips will occupy the same horizontal plane, while the upper edges of all strips will occupy another horizontal plane. This is accomplished by cutting notches in the edges of the strips to a point about midway of the width or depth of the strip and having every other notch disposed on the upper edge of the strips and having the other notches which are disposed between the first notches appearing on the other edge of the strip, so that an over and under weaving operation will provide a mat having a smooth upper and lower surface, and which will have its parts interlocked in position without any other fastening means being employed.

It is another object of this invention to provide a mat woven from strips of flexible material having longitudinal strips and transverse strips woven in an over and under fashion, with notches in the edges of all the strips so as to cause the strips to occupy a straight line and not be bent out of alinement in the weaving operation.

It is a further object of this invention to provide a mat woven from strips of flexible material with the strips having notches cut therein so that the upper edges of the strips extending longitudinally and transversely of the mat will be in the same horizontal plane and likewise, the lower edges of the transversely disposed and longitudinally disposed strips will be in another horizontal plane and also having means whereby the ends of the strips may be secured together to prevent, by any possible chance, the strips becoming separated, especially where the strips are of very flexible material.

By providing a mat woven in this manner, it is evident that the strips of flexible material are thoroughly inter-locked and cannot come apart or be crushed. It is highly essential that the strips be comprised of flexible material because it would be impossible to inter-lock these members in the manner shown should the strips be rigid.

It is another object of the invention to provide a mat woven from strips of flexible material having longitudinal strips and transverse strips woven in an over and under fashion, with notches in the edges of all the strips so as to cause the strips to occupy a straight line and not be bent out of alinement in the weaving operation.

By providing a mat woven in this manner it is evident that the strips of flexible material are thoroughly interlocked and cannot come apart or be crushed. It is highly essential that the strips be comprised of flexible material because it would be impossible to interlock these members in the manner shown should the strips be rigid.

Some of the objects of the invention having been stated, other objects will appear as the description proceeds, when taken in connection with the accompanying drawings, in which:—

Figure 1 is an isometric view of a door mat made in accordance with my invention;

Figure 2 is an isometric view of a typical strip used to form the longitudinal and transverse members of the mat shown in Figure 1;

Figure 3 is an isometric view of the upper left-hand corner of Figure 1 showing the method that is employed in interlocking these strips;

Figure 4 is a transverse section through a portion of one of the strips, showing its structure when it is cut from a discarded pneumatic tire casing.

Figure 5:
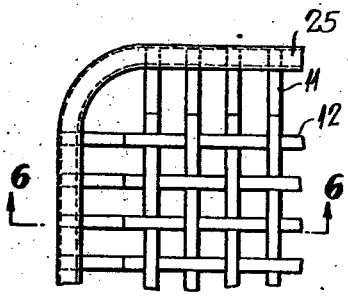
Figure 5 is a top plan view of one corner of a mat as shown in the previous figures but provided with means for fastening the ends of the strips together.

Referring more specifically to the drawings, the numeral 10 indicates a mat which may be of any desired length or width to accommodate various conditions. This mat is comprised of a plurality of longitudinally disposed strips 11 which are interlocked with transversely disposed strips 12, both strips being identical in construction with the exception of the length. These strips 11 and 12 are usually composed of any suitable resilient material such as rubber and the like, or it may be from discarded automobile tires. The longitudinal strips 11 have a plurality of notches 13 cut in the upper side thereof and midway between the notches 13 on the lower side of strip 11 are a plurality of notches 14.

The ends of strips 11 are beveled off as at 15 so as to present a sloping appearance to the edges of the carpet or mat. Transverse strips 12, in a like manner, have a plurality of notches 16 cut in the upper side thereof and also a plurality of notches 17 cut on the lower side thereof said notches 17 being disposed at intervals half-way between the notches 16. Figure 3 shows the method of interlocking these members and it is seen that the notches 14 in the lower side of member 11 are adapted to fit into the notches 16 in the upper side of member 12. Likewise, the notches 17 in the lower side of member 12 are adapted to fit into the notches 13 in the upper side of member 11. Strips 12 also have beveled ends 18 which are similar in all respects to ends 11.

When a mat is formed in this manner it is impossible for it to collapse or fall apart since each strip alternately passes over and under each adjacent strip to form a perfect weave.

Figures 1 to 3 inclusive show the strips made of rubber, though I desire it to be understood that these strips may be made of any suitable material which is rigid enough to withstand the weight of persons walking thereon, yet flexible enough to enable the mat to be woven.

Figure 4 shows a structure of a strip when the same is cut from a discarded automobile tire. There it is seen that the several layers of fabric 20 appear on one side of the strip while the strip 21 of rubber is disposed on the other side. All these layers are vulcanized together in the manufacture of the tire.

Figure 6:
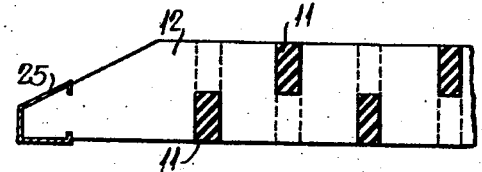
Figure 6 is an enlarged detailed sectional view taken along line 6—6 in Figure 5.

In Figures 5 and 6 means are shown for fastening the ends of strips together. Here it is seen that the sloping ends of the strips 11 and 12 have suitable notches cut therein which are engaged by a crimped metallic member which grips the ends of all of the strips and passes entirely around the mat. Although, if desired, it may be separated at certain points, and especially at the corners thereof to permit greater flexibility of the mat so that it will conform to uneven surfaces when spread thereon.

This metallic strip 25 is crimped around the ends of members 11 and 12 and therefore prevents any unraveling or displacement of these strips due to rough usage.

Figure 7:
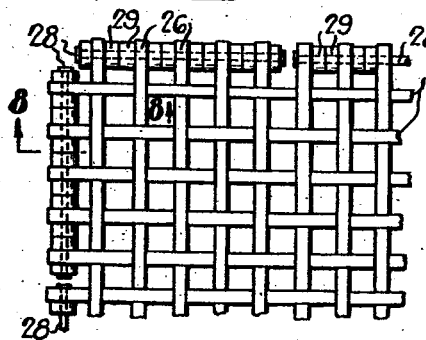
Figure 7 is a plan view of another means for fastening the ends of the strips together.
Figure 8:
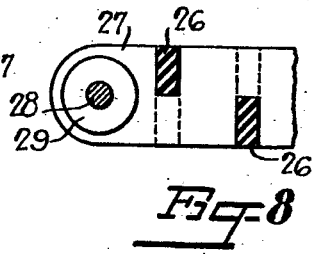
Figure 8 is a transverse sectional detail view taken along line 8—8 in Figure 7.

In Figure 7 a slightly modified form of the invention is shown in which the longitudinal strips 26 as well as the transversely disposed strips 27 are secured together at their ends in groups by means of a pin 28 passing through the ends of said strips and having suitable washers 29 disposed between the strips and said pins 28 being bradded at their ends so that the strips are bound together to prevent unweaving of the same, due to rough usage. The strips being fastened in this manner in groups, causes the mat to retain its flexibility to conform to uneven surfaces.

Figure 9:
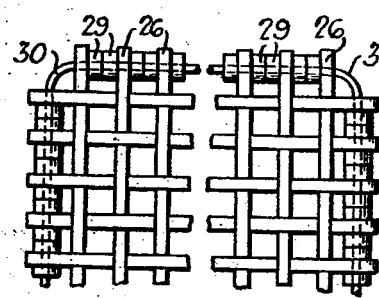
Figure 9 is a view similar to Figure 7 but showing a continuous fastening means extending through the ends of all of the strips.

In Figure 9 a slightly modified form of the invention is shown in which longitudinal strips 26 and the transverse strips 27 are bound together by a continuous wire member 30 which passes through the ends of all of the strips 26 and 27 as well as washers 29 disposed between the strips to space the same from each other. This does not give the super-flexibility of the previously described construction, but merely shows one of the forms of binding the ends of the strips together.

The strips 11 and 12 or 26 and 27 may be of more flexible material when bound together at their ends, since their rigidity is not depended upon to hold the strips in position.

Figure 10:
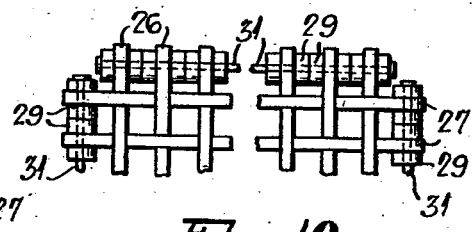
Figure 10 is a view similar to Figure 7 but showing a separate fastening means for each of the four sides of a quadrilateral mat.

Figure 10 shows a structure similar to Figure 9 in which the wire fastening means 31 with washers 29 thereon does not extend past the corners of the mat, there being a wire fastening means 31 for each side of each end of the mat.

In the drawings and specification there has been set forth a preferred embodiment of the invention, and although specific terms are employed, they are used in a generic and descriptive sense only, and not for purposes of limitation, the scope of the invention being set forth in the appended claims.

I claim:
1. A floor mat composed of longitudinal and transverse strips of edgewise and laterally flexible pliable material woven together in an over and under fashion, each of the strips having notches cut alternately in their edges at the point of contact between the strips and extending approximately half across the strips so that all portions of the outer edges of all the strips in the finished mat will occupy parallel planes.

2. A floor mat composed of longitudinal and transverse strips of edgewise and laterally flexible pliable material woven together in an over and under fashion, each of the strips having notches in their edges at the points of contact between the longitudinal and transverse strips, the combined depth of a pair of notches being approximately the width of the strips so that all of the strips when woven into the finished mat will have their entire upper edges occupying one plane and their entire lower edges occupying another plane.

3. A floor mat composed of longitudinal and transverse strips of laterally and edgewise flexible and pliable material woven together in an over and under fashion each of the strips having notches cut in their edges at the point of contact between the strips and extending approximately half way across the strips so that all of the strips in the finished mat will occupy an approximately straight line, and means for securing the ends of the strips together to prevent separation of the strips from each other.

4. A mat composed of longitudinal and transverse strips of laterally and edgewise flexible and pliable material woven together in an over and under fashion, each of the strips having notches in their edges at the points of contact between the longitudinal and transverse strips, the combined depth of a pair of inter-engaging notches being approximately the width of the strips so that all of the strips, when woven into the finished mat, will have their upper edges occupying one plane and the lower edges occupying another plane, and means penetrating the ends of the strips for holding them in woven position.

MILTON B. SAMPLE.